United States Patent

[11] 3,580,162

[72] Inventor Nicholas E. Pontecorvo
Tarzana, Calif. (1548 18th St., Santa Monica, Calif. 90404)
[21] Appl. No. 873,265
[22] Filed Nov. 3, 1969
[45] Patented May 25, 1971

[54] CHEESE KNEADING APPARATUS
10 Claims, 8 Drawing Figs.
[52] U.S. Cl. ................................................. 99/243, 99/116, 31/46
[51] Int. Cl. .............................................. A23c 19/12
[50] Field of Search........................................ 259/(Dig. 13); 99/243, 115, 116; 31/46; 107/33

[56] References Cited
UNITED STATES PATENTS
3,381,632  5/1968  Pontecorvo ................... 31/46X
3,403,030  9/1968  Pontecorvo et al. ........... 99/116

Primary Examiner—Walter A. Scheel
Assistant Examiner—Alan I. Cantor
Attorney—Lynn H. Latta ABSTRACT: Presoftened and moistened cheese curd is kneaded into homogenous consistency such as Mozzarella, by feeding it consecutively into successive annular kneading chambers defined between the cylindrical internal surfaces of a series of axially spaced substantially coaxial rings and the surface of a cylindrical mandrel projecting through the series of rings in eccentric relation thereto, the curd moving circumferentially through a restricted pass between areas of closest spacing of the opposed cylindrical surfaces into a wider area of a respective chamber, from which it is deflected axially to a succeeding chamber while carried on the surface of the mandrel.

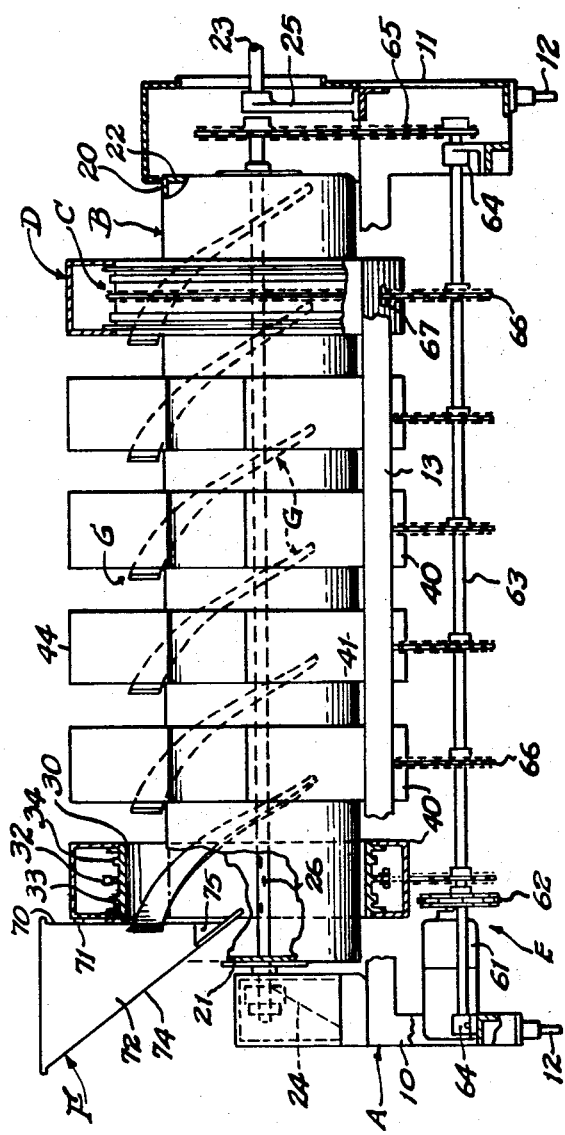
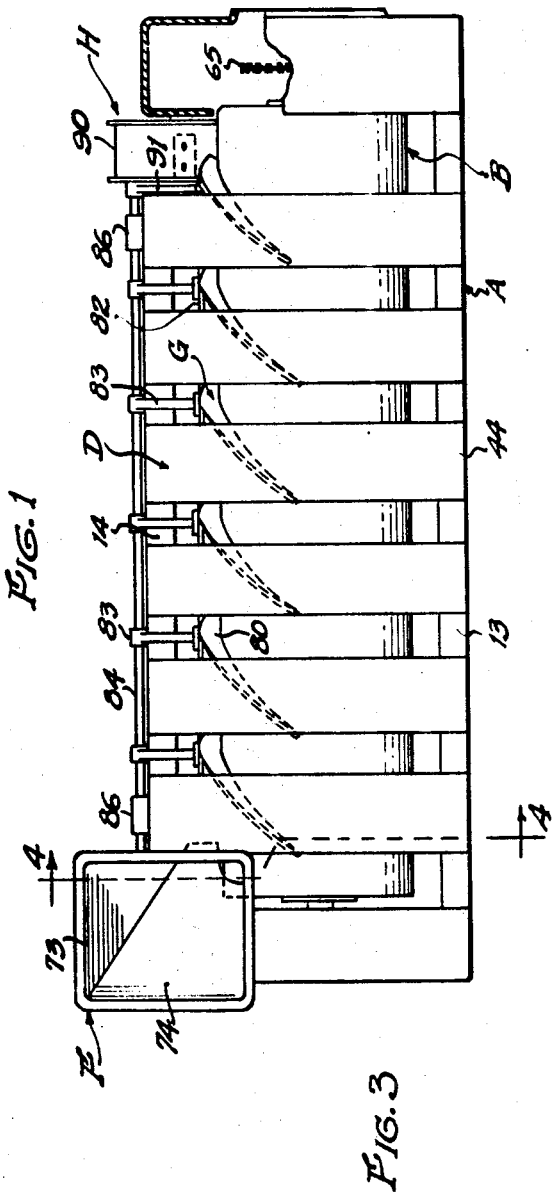
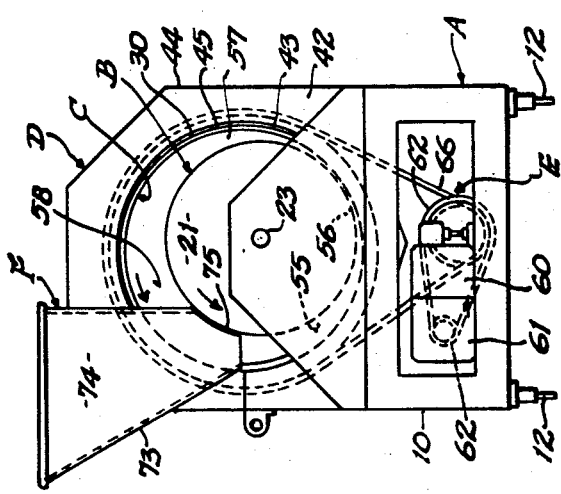
Fig. 1
Fig. 3
Fig. 2
INVENTOR.
NICHOLAS E. PONTECORVO

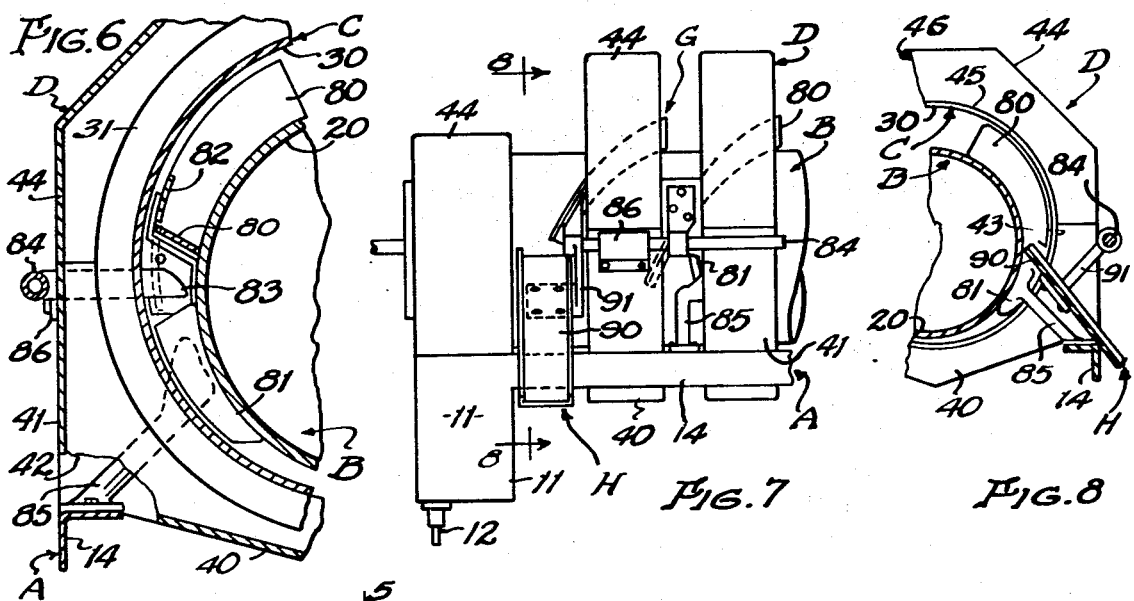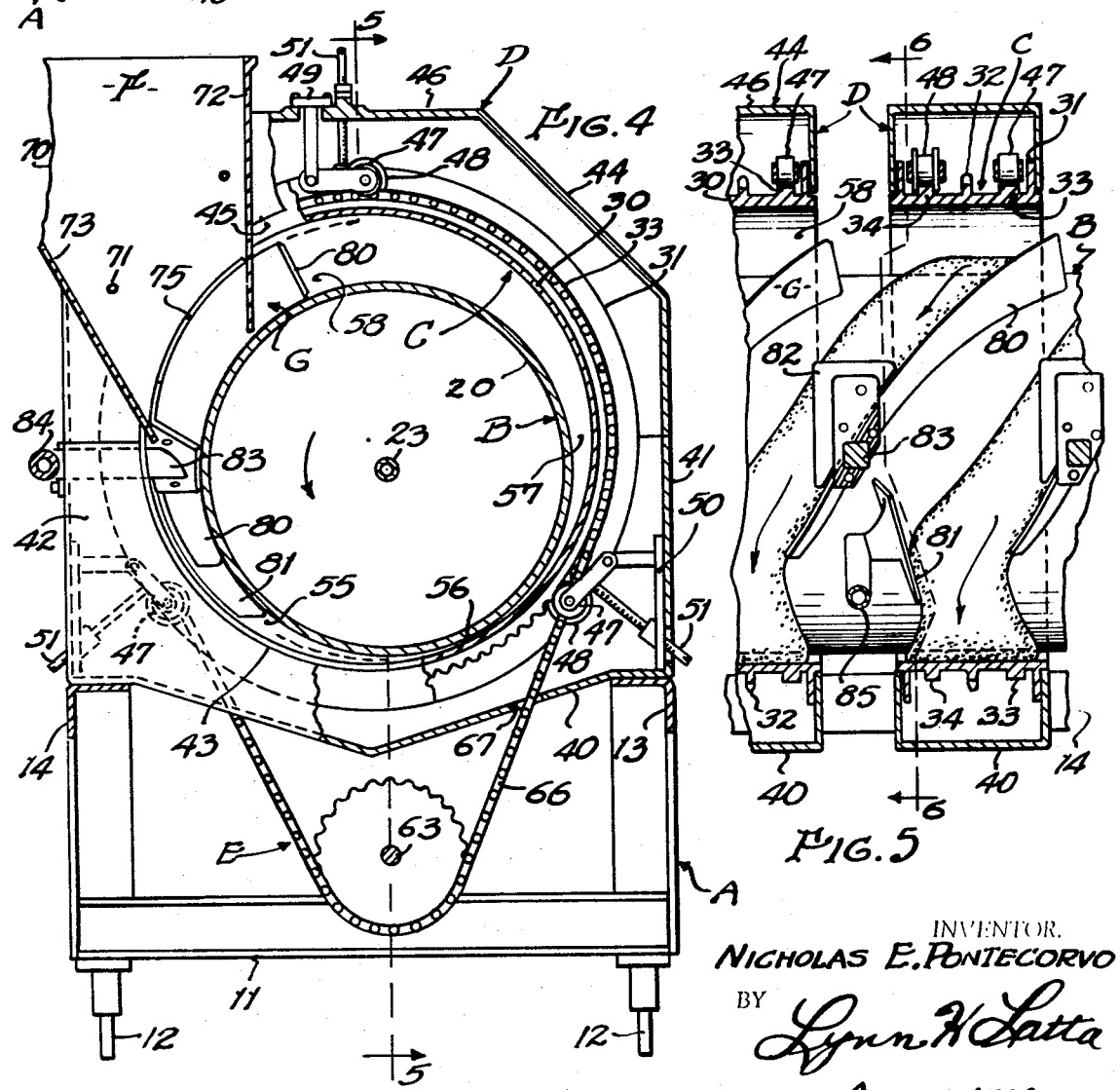

CHEESE KNEADING APPARATUS

BACKGROUND OF THE INVENTION

Processing of cheese curd by conveying it on a belt beneath a succession of kneading rolls, has been disclosed heretofore in the following patents:

Pontecorvo and Shaffer U.S. Pat. No. 3,403,030
Hensgen U.S. Pat. No. 2,768,083

A concept for a cheese processing machine in which cheese curd is alternately compressed and expanded by successive orbits in a helical path around a cylindrical mandrel disposed eccentrically within and rotating within and rotating with a larger cylinder, axial movement being effected by helically disposed deflector blades, is disclosed in the aforesaid U.S. Pat. No. 3,403,030. That concept, however, has never been embodied in an operative machine insofar as I am aware.

The shaping of plastic food material into patties by feeding dough into a series of circumferentially spaced die cavities defined in an internal cylindrical surface of a rotating ring and molding the dough between such cavities and a male cylindrical surface disposed eccentrically within the ring and rotating therewith is shown in my U.S. Pat. No. 3,381,632.

SUMMARY OF THE INVENTION

A plurality of substantially coaxial kneading rings, encased in separate annular casings, spaced axially along the length of a common cylindrical mandrel which extends through the rings in eccentric relation thereto so as to define a plurality of annular kneading chambers having restricted passes at the lower side of the mandrel and wider areas on the upper side of the mandrel, are rotated by a drive which also rotates the mandrel so that the opposed cylindrical surfaces of the chambers move in the same direction and at the same circumferential speed to convey premoistened and softened cheese curd around the mandrel in a succession of circumferential movements through the passes to effect successive compressions of the curd, followed by release of pressure in expansion areas of the chambers. From each expansion area the curd is transferred axially into a contracting feed throat defined between converging surfaces of a succeeding chamber, the axial movements being effected by the movements of the curd stream against deflector blades extending helically from each chamber to the next.

DESCRIPTION

The general object of the invention is to provide a kneading apparatus embodying a relatively simple arrangement of moving parts, of easily cleaned and sterilized materials, eliminating the use of belts, small diameter rolls and numerous bearings, and which is consequently reliable in operation, requiring a minimum of servicing and repair problems, and easy to maintain in a clean and sanitary condition. Specific objects are (1) to avoid curd contamination; (2) to attain better sanitary conditions with less effort and time expenditure; (3) to avoid breakdowns and frequent repairs; (4) to minimize servicing requirements; (5) and to decrease operational expense generally.

These and other objects will become apparent in the following specifications and appended drawings, in which:

FIG. 1 is a front side elevational view of an apparatus embodying the invention;

FIG. 2 is a front end elevational view of the same;

FIG. 3 is a plan view thereof;

FIG. 4 is a vertical transverse sectional view thereof taken on line 4-4 of FIG. 3

FIG. 5 is a vertical longitudinal detail sectional view taken on line 5-5 of FIG. 4;

FIG. 6 is a detail transverse sectional view taken on line 6-6 of FIG. 5;

FIG. 7 is a rear side elevational view of the discharge end of the machine; and

FIG. 8 is a detail transverse sectional view to the same taken on line 8-8 of FIG. 7.

Referring now to the drawings in detail, I have shown therein, as an example of one form in which the invention may be embodied, a cheese kneading machine comprising, in general, a frame A supporting a cylindrical mandrel B for rotation on a horizontal longitudinal axis, a plurality (FIGS. kneading rings C surrounding the mandrel B in axially spaced relation and encased in respective casings D carried by frame A, drive mechanism E providing individual drives to the respective rings C and to the mandrel B, a feed hopper F for delivering raw cheese curd to one end of the machine to be conveyed thereon as a continuous, generally helical stream, a series of deflector and retainer blades G for transferring cheese stream successively from one ring C to another along mandrel B, and a delivery chute H (FIGS. 7 and 8) for discharging processed cheese from the other end of the machine.

In detail, frame A comprises respective end members 10 and 11 having adjustable levelling legs 12, and longitudinal rails 13 and 14 at respective front and back sides, the front side being seen in FIG. 1.

Mandrel B comprises a cylindrical tubular body 20, respective end members 21 and 22, and an axial shaft 23 extending through and secured to end members 21 and 22. Shaft 23 is journaled in respective bearing standards 24 and 25 mounted on respective frame end members 10 and 11.

Each kneading ring C (FIG. 5) comprises a rim 30 having an unobstructed cylindrical internal surface and having on its outer surface integral ring gear 32, and integral annular bearing lands 33 and 34 spaced axially between the flanges 31 and the ring gear 32.

Each kneading ring housing D comprises a fixed lower section having a bottom pan 40 bridging between and having respective ends mounted on frame rails 13 and 14, lateral uprights 41, and upright sidewalls 42 of U-shape, having central gaps 43 defined within semicylindrical margins. Each housing D also includes a removable top section 44 of hollow arch form having respective wall members registering with the uprights 41 and walls 42, having central gaps 45 registering with lower gaps 43 to define central openings, and having a top central member 46. Suitable releasable fastener means (not shown) are employed to secure the downwardly projecting lateral members of top section 44 to the lateral uprights 41 of the bottom section. The upright sidewalls 42 of the lower housing section and their counterparts in the upper section are in embracing, overlapping relation to the flanges 31 of a kneading ring C, so as to enclose the ring within the housing D, with the marginal portions of rim 30 loosely (rotatably) fitted within the margins of circular openings defined by central gaps 43 and 45.

Each kneading ring C is rotatably mounted in its respective housing D by means of rollers 47 (unflanged) and 48 (flanged) riding against the bearing lands 33 and 34 respectively. The flanges of roller 47 embrace the sides of land 33 to hold the ring C against axial displacement from a position in which the ring's flanges will rotate in close association with the adjacent housing walls but free of rubbing contact therewith. The rollers are arranged in three pairs, one at the top and one at each side near the bottom of the housing, so as to provide adjustable, centering, rolling support for the kneading ring. Rollers 47 and 48 are mounted in brackets 49 depending from housing top 46 and in brackets 50 mounted in the lower corners of the housing. Adjusting screws 51, threaded through top 46 and through brackets 50, are operable to adjust the three pairs of rollers inwardly into proper rolling contact with the lands 33, 34 such as to establish the selected eccentric relation between each kneading ring and the mandrel B, and hence the widths of restricted kneading passes hereinafter described.

Each kneading ring C is positioned with its rotational axis disposed above the axis of mandrel B, thus providing a crescent-shaped annular processing chamber including a feeding area 55 converging to a restricted kneading pass 56 from which the chamber broadens into an expansion area 57 leading to a transfer area 58 from which the curd is deflected axially to the feeding area 55 of the next chamber, as described hereinafter.

Drive mechanism E comprises a motor 60 and reduction gear 61 mounted on a lower crossbeam of frame end member 10, a drive (e.g. sprocket and chain type) 62 from gear 61 to a shaft 63 extending the length of the machine between bearings 64 mounted in the lower portions of end members 10 and 11; a drive 65 from shaft 63 to mandrel shaft 23, and drives 66 (e.g. chain and sprocket) from shaft 63 to the ring gear 32, the chains of these drives extending through openings 67 in the bottom pans 40.

As viewed from the front end of the machine (FIG. 2) the mandrel B and kneading rings C are rotated in a counterclockwise direction as indicated by arrows. Hence, the raw curd delivered into the feeding area 55 of the first kneading chamber will be compressed between the closely spaced surfaces in the restricted passes 56; thence expanded in expansion area 57 as it is conveyed by the upwardly moving and diverging surfaces, and thence carried over the top of the mandrel into the transfer areas 58 where it will be moved against a blade of deflector system G and thereby deflected axially in a helical path into the feeding area of the next kneading chamber while carried on the surface of the mandrel.

Hopper F includes a vertical backwall 70 mounted, as indicated at 71, to the upper section of the first housing D; a vertical sidewall 72 overhanging the downwardly moving side of mandrel B and a sloping front wall 73 and outer sidewall 74 converging to a delivery opening 75 communicating with the feeding area of the first kneading chamber. The front wall 73, at its lower end, projects lightly into the kneading chamber as shown in FIG. 1.

Deflector system G comprises a series of arcuate, tapered helical blades 80 each having a wider portion helically traversing the transfer area of a respective kneading chamber, the blade being inclined downwardly across the gap between the respective kneading ring and the next ring, and having a narrow tip extending into the feeding area of the next kneading chamber so as to deflect the curd downwardly across the gap and into the next chamber as it is carried downwardly by mandrel B. To prevent spilling of the curd from the far side of the feeding chamber into which it is delivered, a blocking blade 81 is positioned in the feeding area at the far side, and is inclined downwardly and inwardly so as to guide the curd back into the chamber if it tends to spill out of the far side thereof. The blades 80 and 81 are tapered and curved to conform to the circumferential contour of the kneading chambers from the transfer areas at the top thereof to the feeding areas therebelow. To prevent spilling of the curd over the outer edges of the blades 80 into the gaps between casings D, a retainer plate 82 of generally triangular shape, having an inclined edge fitted to that portion of the outer edge of a respective blade 80 which is exposed in the gap, is supported in a position to provide an arcuate surface conforming substantially to and bridging between the internal surfaces of adjacent kneading rims 30.

Blades 80 and 82 are carried by arms 83 projecting from a support bar 84 extending longitudinally of the machine, its ends being mounted to the fixed lower sections of the end housings D, at 84. Blocking blades 81 are mounted to the frame by means of brackets 86 which preferably are such as to provide for ready removal of the assembly of blades 80, 82, for cleaning and repair purposes.

Delivery chute H FIGS. 7 and 8) may be simply a shallow channel 90 supported by a bracket 91 carried by the rear end of support bar 84. Chute H is inclined downwardly and outwardly over the rear frame rail 14 to discharge the processed cheese externally of the machine.

Mandrel shaft 23 is in the form of a hollow tube having one end extending out of the rear end of the machine and connected to a source of live steam, and having along its length a series of discharge orifices 26 for discharging the steam into the hollow interior of the mandrel to heat it. The heated mandrel maintains the temperature of the curd conveyed thereby at a sufficiently high level for processing into a homogenous state.

OPERATION

As viewed from the front end of the machine (FIG. 2) the mandrel B and kneading rings C are rotated in a counterclockwise direction as indicated by arrows. Hence, the raw curd delivered into the feeding area 55 of the first kneading chamber will be drawn through the kneading pass 56 where it will be compressed between the closely spaced surfaces of mandrel B and ring C. Thence the curd will be carried into the widening area 57 where it will expand upon release of the compression. From the expansion area 57 the curd will be carried by the mandrel into the transfer area 58 at the top of the machine. At this time the curd will be moving circumferentially in the form of an annular ribbon in the vertical plane of the first kneading ring C. In the area 58 it will be moved against the helical deflector blade 80 which extends through that area, and since the arcuate inner edge of the blade is in scraping contact with the mandrel surface, the blade will deflect the curd ribbon into a helical path which will lead it across the gap between the first two kneading rings and into the feeding area 55 of the second kneading chamber, where it will resume an annular path in the plane of the second kneading ring after being released past the end of the deflector blade 80 which has guided it across the gap between the kneading rings. The compression and expansion steps will be repeated in the second and succeeding kneading chambers until the ribbon processed cheese is delivered from the last blade 80 into the delivery chute H. The continuing rotation of the mandrel B will feed the now homogenous ribbon of cheese downwardly through chute H into a suitable receptacle or conveyor for transferring it to another processing apparatus (e.g. molding machine for shaping it into blocks or patties).

Preferably the series of kneading rings C are adjusted to successively closer spacing from mandrel B in the succession from the front (receiving) end to discharge end of the machine, so that as air voids are successively squeezed out of the curd body, it may be compressed to increasingly thinner ribbon in successively narrower passes 56.

A major operational advantage provided by the invention is in the elimination of conveyor belts which, when of rubber or plastic material are virtually impossible to maintain in a sterile, sanitary condition and which, when constructed of metal, are difficult to maintain in satisfactory operating condition and require a high power expenditure for driving them as well as frequent servicing. Rubber belts, if subjected to temperatures required for full sterilization, will be rapidly deteriorated and rendered useless. The parts of the machine of the present invention can be made largely of stainless steel or equivalent corrosion and contamination resistant and easily sterilized material.

I claim:
1. In a cheese kneading machine:
an elongated cylindrical mandrel;
means supporting said mandrel for rotation on a substantially horizontal axis;
a plurality of axially spaced kneading rings encircling said mandrel in eccentric relation thereto so as to define between said rings and said mandrel a plurality of kneading chambers each having a restricted kneading pass, a feeding area converging toward said pass, in the direction of said rotation, an expansion area diverging away from said pass, and a transfer area between said expansion area and said feeding area;
means for rotating said mandrel and kneading rings in unison in a common direction of rotation such that the opposed surfaces of said rings and mandrel move in unison so as to convey cheese curd into said pass for compression of the curd, and so as to convey the compressed curd to said transfer area while allowing it to expand;

means for delivering raw cheese curd into the feeding area of the first of said chambers;

and means traversing said transfer areas for deflecting the curd from the transfer area of one chamber into the feeding area of the next chamber.

2. A machine as defined in claim 1;

wherein said feeding area converges downwardly, said restricted pass is near the bottom of said chamber, said expansion area extends upwardly from said pass, and said transfer area extends downwardly from the top of said chamber;

said deflecting means comprising a series of arcuate blades extending helically around the mandrel and downwardly and axially from the transfer area of one chamber to the feeding area of the next chamber, and traversing the gap between the two chambers.

3. A machine as defined in claim 2, further including:

a plurality of retainer plates each extending upwardly from the outer margin of a respective deflecting blade and traversing the gap between adjacent kneading rings so as to restrain spillage of curd through the gaps.

4. A machine as defined in claim 3, including a plurality of blocking blades in axially opposed relation to lower portions of said deflector blades in positions to prevent spillage of curd over the far sides of the kneading rings opposite the sides where the curd enters the kneading chamber.

5. A machine as defined in claim 1, including annular sectional housing enclosing said kneading rings outwardly of their internal kneading surfaces.

6. A machine as defined in claim 5, including a frame;

said housings including respective lower sections fixed to said frame;

and separate upper sections which are removable for cleaning purposes.

7. A machine as defined in claim 6 said lower sections having bottom pans for catching drippings from said rings.

8. A machine as described in claim 1, including:

annular housings enclosing said kneading rings, said rings having annular flanges projecting radially outwardly said housings having axially opposed walls in radially overlapping relation to said flanges, said walls having radially inward extremity margins of circular form substantially registering with the axial margins of said rings.

9. A machine as defined in claim 8, wherein said ring margins project axially beyond said flanges and into circular openings defined within said circular housing wall margins.

10. A kneading machine as defined in claim 1, including means for delivering processed cheese from the last kneading chamber to a receiving means.